C. DEVERELL.
UNDERCUT SAW GUIDE.
APPLICATION FILED AUG. 15, 1913.
1,096,693.
Patented May 12, 1914.
2 SHEETS—SHEET 1.
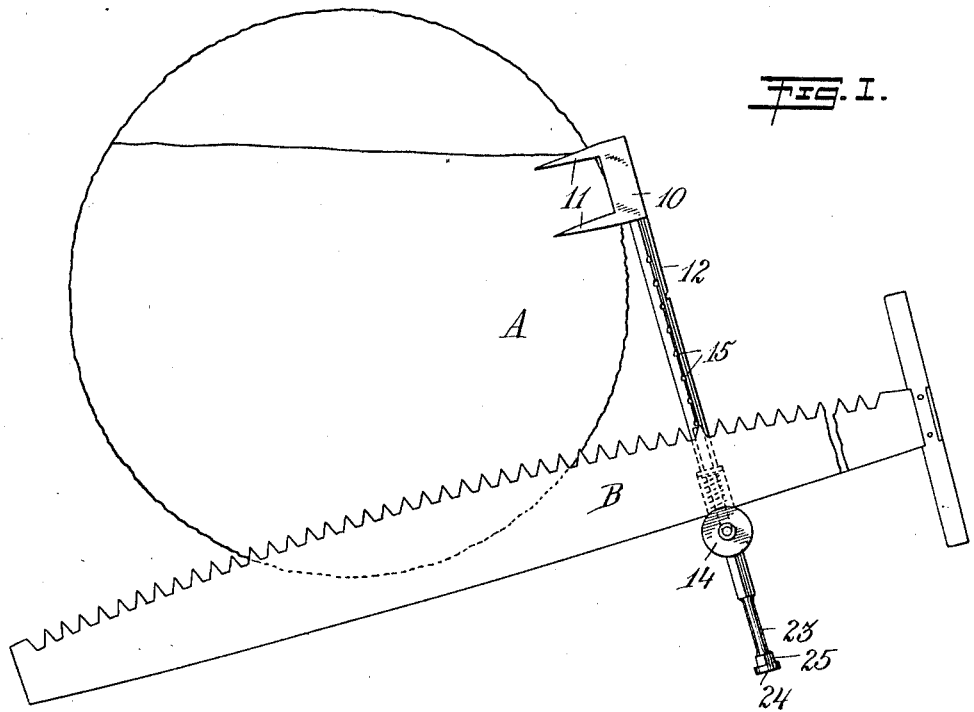
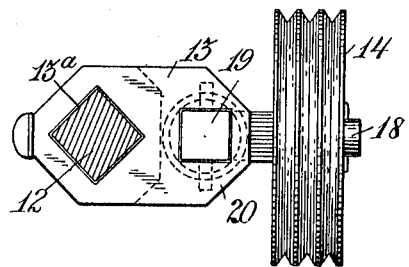
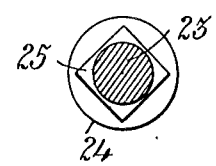
WITNESSES
INVENTOR
Charles Deverell
BY
ATTORNEYS

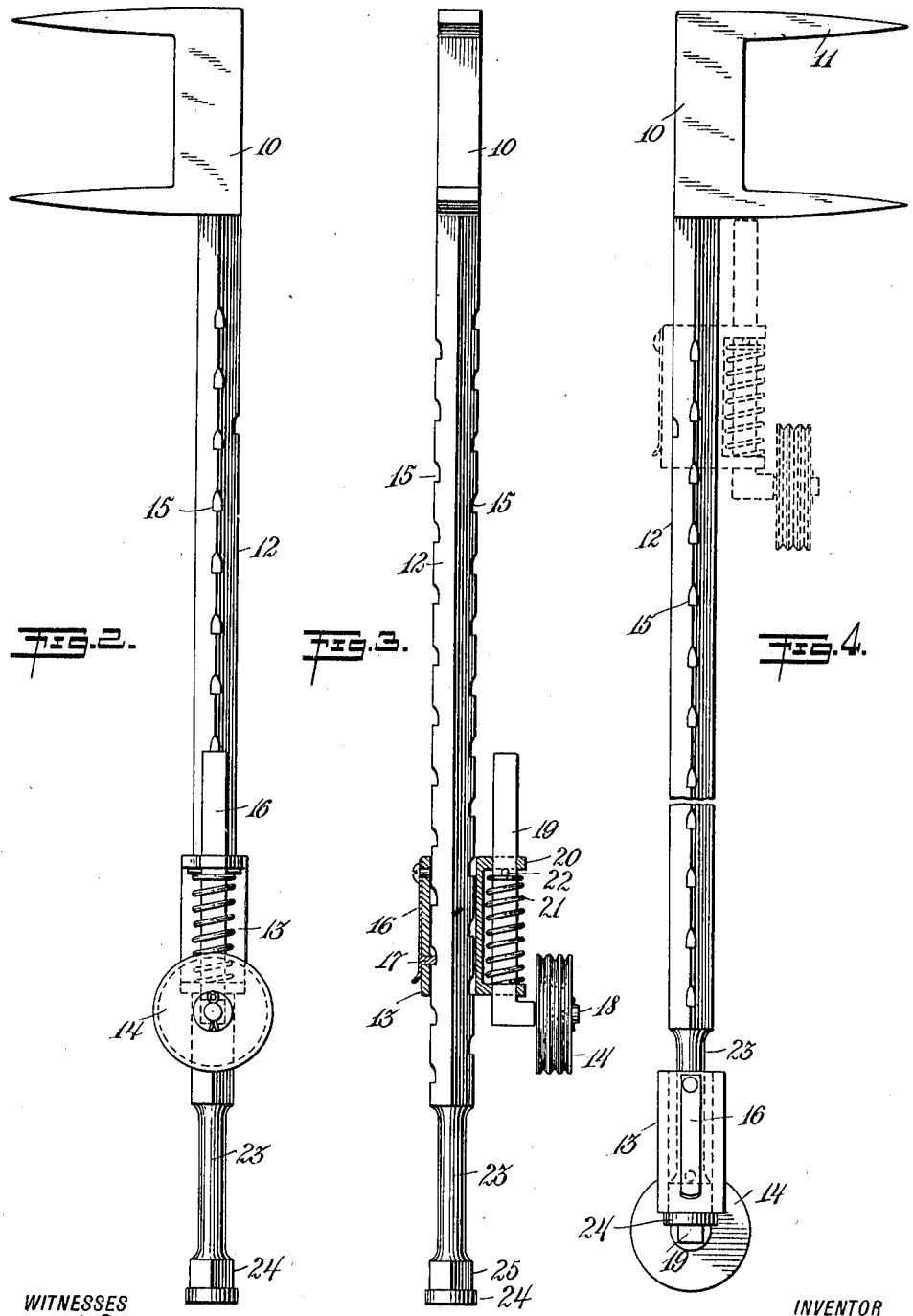

UNITED STATES PATENT OFFICE.

CHARLES DEVERELL, OF PORTLAND, OREGON.

UNDERCUT-SAW GUIDE.

1,096,693. Specification of Letters Patent. Patented May 12, 1914.

Application filed August 15, 1913. Serial No. 784,913.

*To all whom it may concern:*

Be it known that I, CHARLES DEVERELL, a citizen of the United States, and a resident of Portland, in the county of Multnomah and State of Oregon, have invented a new and Improved Undercut-Saw Guide, of which the following is a full, clear, and exact description.

My invention relates to a device for supporting a crosscut saw for making kerfs on the underside of a log with the saw inverted.

The design of my invention is to provide a device of the indicated character which will possess more strength and simplicity than devices ordinarily employed, and which will not involve the employment of devices likely to become broken or disarranged.

The invention will be particularly explained in the specific description following.

Reference is to be had to the accompanying drawings forming a part of this specification in which like characters of reference indicate corresponding parts in all the views, and in which—

Figure 1 is a side elevation of an undercut saw guide embodying my invention, showing the same in position, for use, the view indicating a log and a crosscut saw; Fig. 2 is a side elevation of my device on a larger scale; Fig. 3 is a view taken at right angles to Fig. 2, parts being in section; Fig. 4 is an elevation from the opposite side of the view shown in Fig. 2, and showing the saw supporting wheel in different position; Fig. 5 is a cross section through the shank of the device above the saw supporting wheel; and Fig. 6 is a cross section taken through the lower end of the shank below the saw supporting wheel.

In making a device in accordance with my invention a head 10 is provided having one or more prongs or spikes 11 projecting laterally from one side of the head and adapted to be driven into a log A. Depending from the head 10 is an elongated vertical shank 12 on which is fitted to slide a sleeve 13 carrying a wheel 14 peripherally grooved as usual in such devices to support the saw B in inverted position below the log A.

Provision is made for holding the sleeve 13 at different elevations on the shank 12, and to this end co-acting means are provided on the sleeve and shank. The said means in the present instance comprises two diametrically opposite vertical series of notches 15 on the shank, and a spring dog 16 is carried by the sleeve, the dog having a pin 17 adapted to engage in any one of the notches 15. The shank for the greater portion of its length is square or otherwise made non-circular in cross section, and the bore 13ª of the sleeve 13 is correspondingly formed to prevent turning of the sleeve on the shank.

The saw supporting wheel 14 is mounted on a stud axle 18 formed on the lateral member of an L-shaped bar 19 which is fitted in a sleeve for limited vertical movement. The said bar has guided movement in alined holes in vertically spaced lateral lugs 20, and between said lugs a spiral spring surrounds the bar 19, there being a transverse pin 22 engaging the spring. The arrangement is such that with the back of the saw resting on the roller 14, the wheel and its supporting bar can yield vertically and accommodate themselves to the roll or belly of the saw. The pin 22, it will be observed, engages the spring, to compress the same when the bar moves downward, and forms a stop limiting the upward movement of the bar. The notches 15 in the shank 12 present outwardly inclined upper walls and shoulders at the bottoms of the recesses, on which shoulders the ends of the dog 17 may rest, to firmly support the slide and roller.

In order that the wheel 14 may be supported at either side of the shank 12 and thus make the device reversible to either side of the log, provision is made for turning the sleeve 13 on the shank, for which purpose the shank near the lower end is of reduced diameter and preferably made round as at 23, so that when the sleeve 13 is moved down to the portion 23, said sleeve may be turned to swing the saw supporting wheel to either side of the shank. In the case of large logs, the kerf is started with the saw guide supported at the lower end of the shank below the notched portion, for which purpose the head or flange 24 is formed below the lower end of the portion 23, and immediately adjacent the said head the shank has square or non-circular formation as at 25, to conform to the lower end of the bore of the sleeve whereby to support the latter resting against the flange 24.

With my improved construction there are no parts liable to become broken, and moreover, the device may be readily and conveniently adjusted to suit the work at hand.

Having thus described my invention, I claim as new and desire to secure by Letters Patent:

An undercut saw guide comprising a shank having a laterally projecting fastening member at its upper end, a sleeve slidable vertically on the shank, there being coacting means on the shank and sleeve to hold the latter at different elevations, the sleeve having vertically spaced lateral lugs at one side, in alinement with each other, a bar extending through said lugs parallel with the shank and having limited movement vertically, a spiral spring on the bar between the lugs, yieldingly supporting the bar, a pin passing transversely through the bar at the upper end of the spring, forming a stop limiting the upward movement of the bar and serving to engage the spring when the bar moves downwardly, said bar having a lateral stud axle, and a saw supporting wheel on said axle.

In testimony whereof I have signed my name to this specification in the presence of two subscribing witnesses.

CHARLES DEVERELL.

Witnesses:
LILLIAN H. CANARIO,
JOSEPH GIRARD.

Copies of this patent may be obtained for five cents each, by addressing the "Commissioner of Patents, Washington, D. C."